March 25, 1958 W. A. DE VELLIER 2,827,820
SELF-TAPPING SCREWS

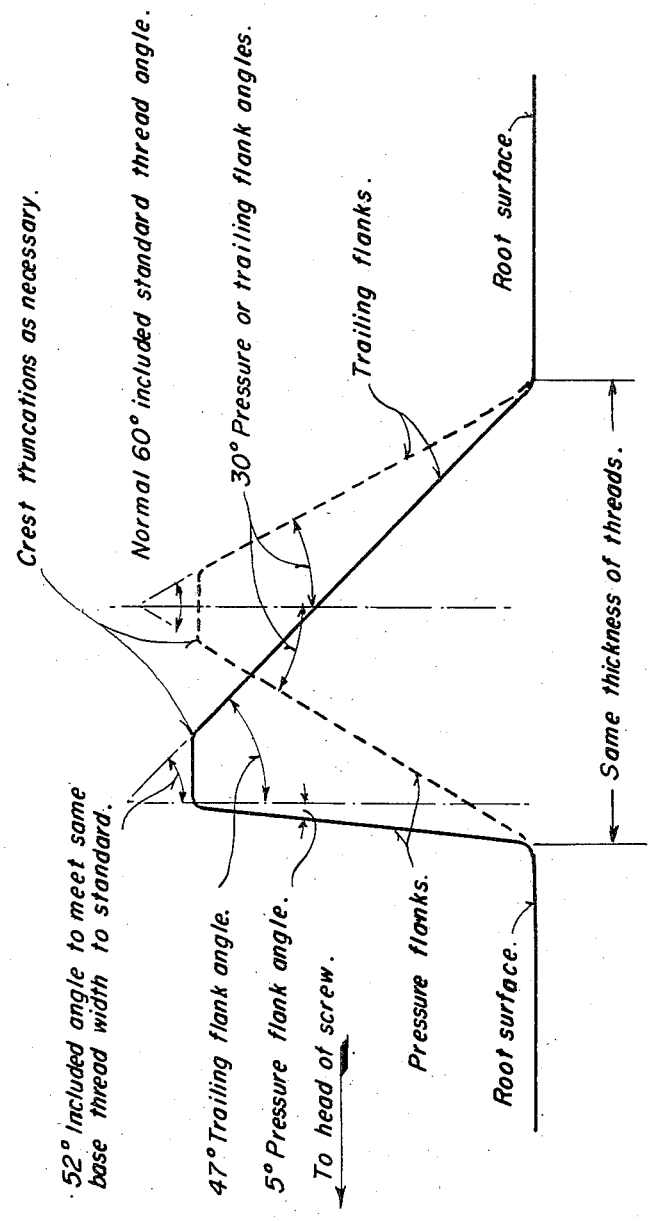

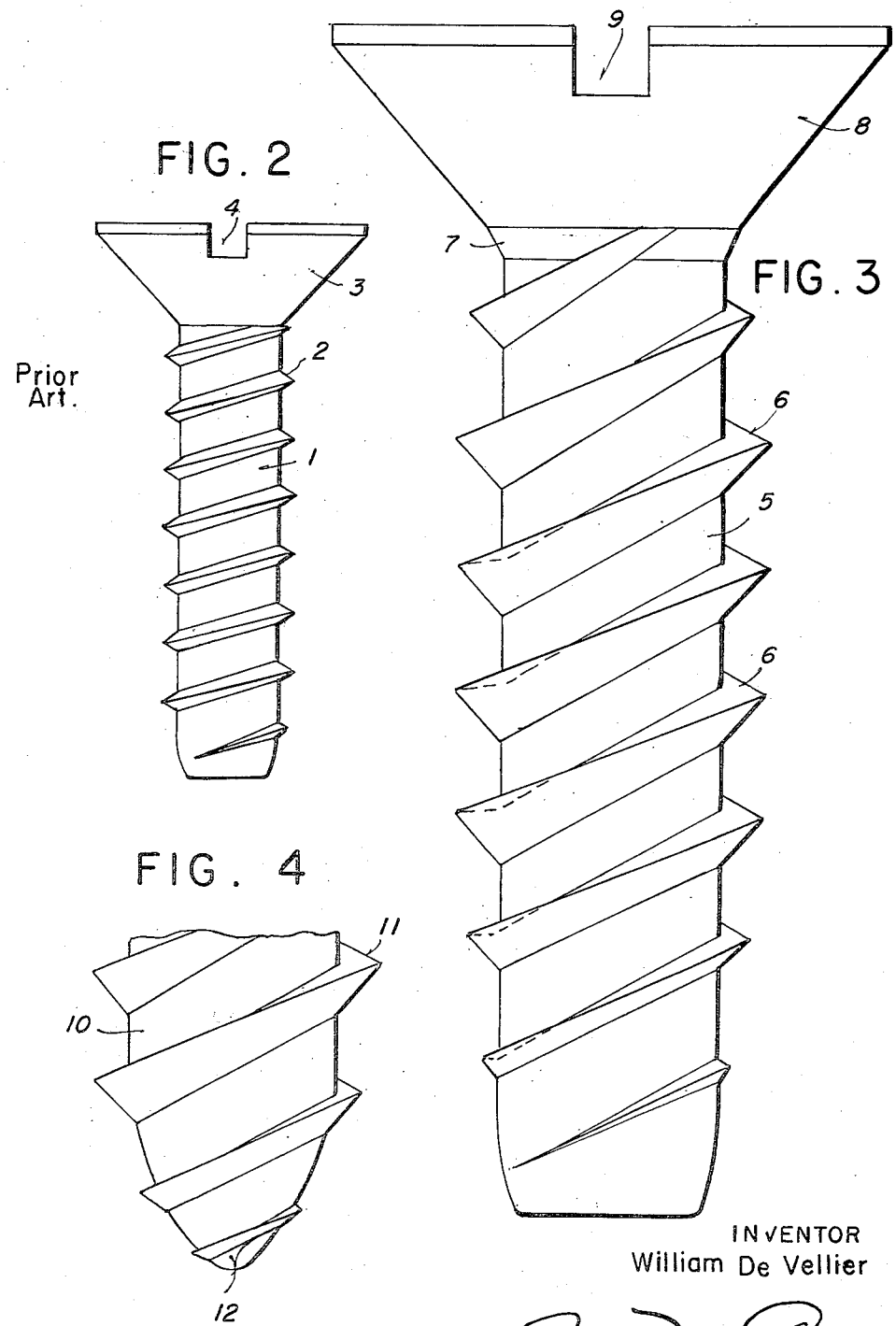

Filed Jan. 16, 1956 3 Sheets-Sheet 3

William A. DeVellier INVENTOR

BY *James M. Crane*
ATTORNEY

United States Patent Office 2,827,820
Patented Mar. 25, 1958

2,827,820
SELF-TAPPING SCREWS

William A. De Vellier, Hollywood, Calif.

Application January 16, 1956, Serial No. 559,181

1 Claim. (Cl. 85—48)

This invention relates to double threaded sheet metal or self-tapping screws, including so-called type A screws wherein the shaft and threads come to a point as well as so-called type B screws wherein the threads terminate short of a blunt terminal. More particularly, the invention relates to and is concerned with screws of this character which are adapted to secure sheet metal parts together as well as for use with the conventional Tinnerman nut or fastener.

It is one of the objects of the invention to provide die-rolled double threaded sheet metal screws having enhanced overall strength and holding power with a minimum of tendency for the head to "pop off" when tightened in the work.

Another object is to provide double threaded sheet metal screws designed to pick up sheet metal evenly and lock the same into position without causing canting either of the material being fastened together or of the screw itself.

A further object is the provision of screws of this character which pick up the metal of the work evenly, lodging it squarely around the root of the screw to lift the metal evenly into place beneath the head of the screw, thus obviating the misalignments, misses and bulges so commonly encountered with the use of the conventional 30° angle screw.

A still further object is to provide double threaded sheet metal or self-tapping screws capable of applying unusually even pressure on the assembled metal sheets of the work, thus providing rivet-like holding power and eliminating shear or scissor action encountered with conventional screws.

Another object is the provision of screws of this character having much greater holding power, for the same applied torque, than the conventional 30° angle screw.

The foregoing and other objects of the invention will be best understood from a description of the embodiments thereof shown in the accompanying drawings wherein like reference characters denote like parts and in which:

Fig. 1 is a diagrammatic showing of the thread design of the screws of the invention in comparison with the conventional 30° angle screw;

Fig. 2 is a side elevation of a conventional 30° angle screw;

Fig. 3 is a side elevation of the screw of the present invention of type B form;

Fig. 4 is a front elevation, partly broken away, of an embodiment of the invention as applied to the type A screw;

Figure 5:
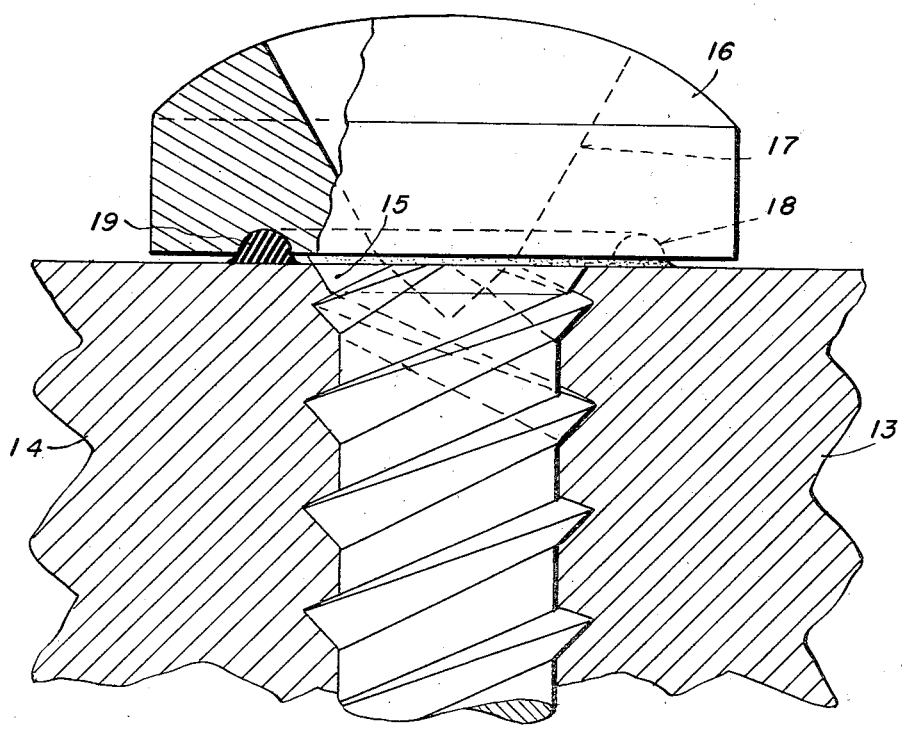
Fig. 5 is a front elevation, partly in section, showing the screw as it is formed in the rolling dies, and, Fig. 6 is a front elevation, partly broken away, of the blank prior to die-rolling.

The invention here is predicated, at least in part, upon the discovery that the so-called pressure flank angle of the double threads should be kept within certain well-defined and highly critical limitations. In order that this important feature of the invention may be understood, reference is had particularly to Fig. 1. In this figure of the drawings, the threads of the conventional 30° angle screw are depicted in dotted lines, whereas the threads of the screws of the present invention are depicted in full lines. It will be noted, with respect to the conventional 30° angle screw, that the trailing flank as well as the pressure flank is at a 30° angle with the root surface so that both the pressure flank angle and the trailing flank angle are 30°, the included angle being 60°. In the thread of the screw of the present invention, on the other hand, the pressure flank angle, which is that angle included between a line vertical to the root surface and the pressure flank, is indicated as 5°. This has been found to be the optimum pressure flank angle. However, this pressure flank angle may be varied to as low as 2°, and as high as 15°. While this gives some latitude for variation of the pressure flank angle, the lower limit of 2° and the upper limit of 15° have been found to be highly critical. Of course, as the pressure flank angle varies between these upper and lower critical limits, so also will the included angle vary for each given pressure flank angle, and in the case where the optimum pressure flank angle is 5°, as shown in Fig. 1, the included angle will be 52° while the trailing flank angle will be 47°.

By providing double threaded sheet metal or self-tapping screws with buttress-type threads having a slow pitch and pressure flank angle falling within the aforesaid critical limits, and particularly where the pressure flank angle is approximately 5%, such screws, it has been discovered, will pick up the metal of the work evenly, lodging it squarely around the root of the screw to lift the metal evenly into place beneath the head of the screw. Such action obviates or substantially minimizes the misalignments, misses and bulges so commonly encountered with the conventional 30° angle screw. Moreover, the critical pressure flank angle enhances the general strength of the screw. Unusually even pressure on the assembled metal sheets is obtained thus eliminating shear or scissor action. Greater holding power is achieved without canting either of the work or of the screw. By providing the double threads with this critical pressure flank angle, any ragged edges of the hole punched through the metal are straightened out because the metal will rest on the substantially square surface of the pressure flank of the thread and will not be inclined at an angle of 30° as in the case of the conventional 30° angle screw. It is not only the critical pressure flank angle per se which gives rise to these improved results but the association of this pressure flank angle with double threads and, in addition, the combination of these two features with a novel fillet, which fillet will be discussed in detail hereinafter.

In Fig. 2 of the drawing is shown a typical 30° angle double threaded type B screw of the prior art having shaft 1, double threads 2, head 3 and head slot or turning cavity 4.

In Fig. 3 there is shown a screw manufactured in accordance with the present invention and in this particular embodiment, a type B screw is depicted having shaft 5, double threads 6 having the hereindescribed critical pressure flank angle, fillet 7, head 8 and slot 9. Fig. 4, of course, is the same screw as shown in Fig. 3, except that it is of type A having shaft 10 and double threads 11 which taper down to a comparatively sharp point 12.

Figure 6:
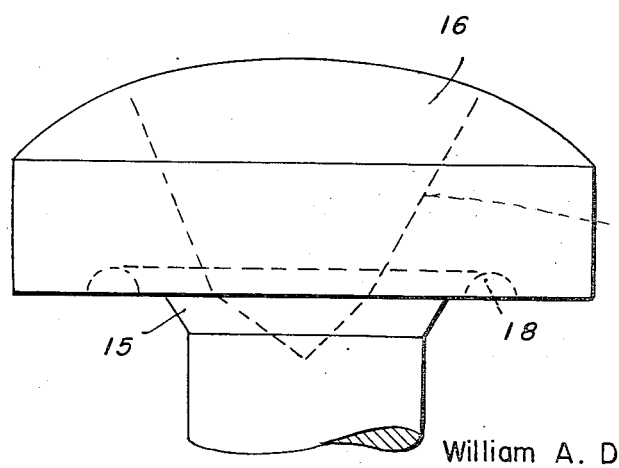

The provision of a fillet shown at 7 in Fig. 3, and at 15 in Figs. 5 and 6 of the drawing, equal to about one half of the thread, is another very important feature of the present invention, and in combination with the features of low pitch buttress-type double threads and the critical pressure flank angle, makes for maximum efficiency. By providing such a fillet immediately beneath the screw head the overall strength of the screw is materially increased. Moreover, holding power is enhanced with a minimum tendency for the head to "pop off" when tightened in the work.

In Fig. 5 there is depicted a screw of the present invention just after it has been formed between stationary die 13 and reciprocating rolling die 14. In this particular embodiment shown in Fig. 5, the screw is die-rolled from the blank shown in Fig. 6. The screws are die-rolled substantially in accordance with the methods disclosed in my prior Patents Nos. 2,314,390, 2,314,391, 2,373,878, 2,483,186 and 2,373,948, and such die-rolling procedures are incorporated herein by reference. The blank is made with fillet 15 extruded in the header and in the die-rolling operation, the double threads are cut right in the fillet up to a point just under head 16. Head 16, shown in this embodiment with a Phillips type recess 17, may also be provided, if desired, with an annulus 17 to accommodate a conventional resilient O-ring 18.

Attempts have been made in the past to cut threads running the whole length of the shaft and terminating just under the head. When this is done, however, it has been found that the thread is never full-finished formed because there is simply not sufficient metal immediately under the head. The metal just below the head at the juncture of the head and the shaft becomes overworked and brittle at that point. Consequently, it has been found that when torque is applied to drive such a screw, the head fractures and fails either immediately or shortly thereafter. By providing the fillet of the present invention there is sufficient metal to produce a finished thread, with the finished thread graduating into the head. The metal is not overworked and does not become brittle at the juncture of the head and shaft. Stated differently, by employing a fillet the metal at the point is kept workable and easy-flowing, thus permitting the termination of the threads into the screw head without setting up any undue stresses or scarring. Running the twin thread right into the underside of the head, i. e., into the fillet, keeps the head level and free from canting. More important, the fillet furnishes that additional bit of metal needed to flow into the die.

What is claimed is:

A die-rolled sheet metal screw having a shaft, a head, double threads running the length of the shaft, said threads having a critical pressure flank angle, as herein described, of from 2° to 15°, and a fillet, the amount of metal in the fillet being approximately one-half of the amount of metal within the included angle of a full thread, the top of the fillet extending out from the shaft approximately one-half the distance as does each full thread, said fillet being extruded integral with said shaft directly under the head, said double threads being die-rolled and cut right in said fillet up to a point just under said head.

References Cited in the file of this patent

UNITED STATES PATENTS

| 2,005,672 | Chaffee | June 18, 1935 |
| 2,172,258 | Place | Sept. 5, 1939 |
| 2,713,883 | Poupitch | July 26, 1955 |

FOREIGN PATENTS

| 794,378 | France | Dec. 12, 1935 |

OTHER REFERENCES

National Bureau of Standards Handbook H28 (1944), Screw-Thread Standards for Federal Services, published February 17, 1945.